United States Patent
Nishiyama et al.

(10) Patent No.: US 7,043,913 B2
(45) Date of Patent: May 16, 2006

(54) TURBOCHARGER

(75) Inventors: Toshihiko Nishiyama, Oyama (JP); Hiroshi Sugito, Oyama (JP); Takahisa Iino, Oyama (JP); Tetsuaki Ogawa, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/869,098

(22) Filed: Jun. 17, 2004

(65) Prior Publication Data

US 2005/0028523 A1    Feb. 10, 2005

(30) Foreign Application Priority Data

Jun. 23, 2003    (JP)    ............... 2003-177935

(51) Int. Cl.
  F02B 37/02    (2006.01)
  F02B 37/00    (2006.01)
  F01D 9/06    (2006.01)
  F01D 9/00    (2006.01)

(52) U.S. Cl. ........................ 60/602; 415/205

(58) Field of Classification Search ............... 60/602, 60/605.1, 605.2; 415/203–205; F02B 37/00, F02B 37/02; F01D 9/06
See application file for complete search history.

(56) References Cited

U.S. PATENT DOCUMENTS

| | | | | |
|---|---|---|---|---|
| 3,408,046 A | * | 10/1968 | Woollenweber, Jr. | 415/205 |
| 4,355,503 A | * | 10/1982 | Grohn | 60/602 |
| 4,512,152 A | * | 4/1985 | Asaba | 60/601 |
| 4,544,326 A | * | 10/1985 | Nishiguchi et al. | 60/602 |
| 6,742,989 B1 | * | 6/2004 | Osako et al. | 415/205 |

FOREIGN PATENT DOCUMENTS

| | | | |
|---|---|---|---|
| DE | 895677 | * | 11/1953 |
| DE | 2230718 B | * | 6/1979 |
| DE | 3343429 A1 | * | 6/1985 |
| EP | 474007 A2 | * | 3/1992 |
| FR | 2545875 | | 11/1984 |
| JP | 54038431 | | 3/1979 |
| JP | 57020517 A | * | 2/1982 |
| JP | 57-124028 | | 8/1982 |
| JP | 59122726 A | * | 7/1984 |
| JP | 63289214 A | * | 11/1988 |
| JP | 8-28286 | | 1/1996 |
| JP | 08284602 A | * | 10/1996 |
| JP | 10141074 A | * | 5/1998 |
| JP | 2002089377 A | * | 10/2003 |
| JP | 2005113871 A | * | 4/2005 |
| JP | 2005147010 A | * | 6/2005 |
| JP | 2005147011 A | * | 6/2005 |
| SU | 1477921 A | * | 5/1989 |
| WO | WO 01/019496 A1 | * | 2/2001 |

* cited by examiner

Primary Examiner—Thai-Ba Trieu
(74) Attorney, Agent, or Firm—Posz Law Group, PLC; R. Eugene Varndell, Jr.

(57) ABSTRACT

There is provided a turbocharger whose constitution is compact, in which exhaust interference seldom occurs, and which can be applied also to an EGR type engine. In the turbocharger, an introduction part of an exhaust inflow passage possesses a partition part dividing a range from an inlet to a predetermined position in a downstream of the inlet into two exhaust inflow passages, a throttle part, whose sectional area becomes gradually small, from the inlet to a position where the partition part ceases, a joining part where exhaust gases passing through the left and right exhaust inflow passages are joined, and a diffuser part, whose sectional area becomes gradually large, from the joining part to a tongue part.

12 Claims, 11 Drawing Sheets

TURBOCHARGER

BACKGROUND OF THE INVENTION

1. Field of the Invention

The present invention relates to a turbocharger.

2. Description of the Related Art

From old times, as means increasing a charge amount of engine, there has been known a turbocharger compressing the air and charging it to the engine by rotating a turbine wheel by utilizing an energy of exhaust gas, and driving a compressor wheel of a centrifugal type through a shaft formed monolithically with the turbine wheel.

In FIG. 7, there is shown a piping system diagram of an engine using the turbocharger concerning the prior art. It is explained with a straight 6-cylinder engine 62 being taken as an example. The engine 62 possesses six cylinders 64A, 64B linearly arranged. The six cylinders 64A, 64B are classified into the upside three cylinders 64A and the downside three cylinders 64B. The upside cylinders 64A are referred to as front cylinder group 64A, and the downside cylinders 64B are referred to as rear cylinder group 64B.

Exhaust ports of the front cylinder group 64A are connected to a front exhaust manifold 65A, and exhaust gases 63A exhausted from the exhaust ports of the front cylinder group 64A join in the front exhaust manifold 65A. Exhaust ports of the rear cylinder group 64B are connected to a rear exhaust manifold 65B, and exhaust gases 63B exhausted from the exhaust ports of the rear cylinder group 64B join in the rear exhaust manifold 65B.

The exhaust gas 63A emerging from the front exhaust manifold 65A flows into a left exhaust inflow passage 19A of a turbocharger 11 while passing through a front exhaust piping 75A. The exhaust gas 63B emerging from the rear exhaust manifold 65B flows into a right exhaust inflow passage 19B of the turbocharger 11 while passing through a rear exhaust piping 75B.

In this manner, for the front/rear cylinder groups 64A, 64B, by providing respectively the front/rear exhaust manifolds 65A, 65B and the front/rear exhaust piping and it was going to use radio and minimum woman OK one does not as owner audio OK does not we do not those long as I did all that follow 75A, 75B, it is possible to reduce an exhaust interference. A turbine wheel 14 is rotated by flows of the exhaust gases 63A, 63B passing through the exhaust inflow passages 19A, 19B, and a compressor wheel 16 is rotated through a shaft 23. By this, the air compressed is cooled while passing through an after-cooler 67, and supplied to each of the cylinders 64A, 64B through a charge manifold 71.

Next, it is explained in detail about the turbocharger 11. In FIG. 8 and FIG. 9, the turbocharger 11 possesses an exhaust side part 12 taking out a rotation energy from the exhaust gases 63A, 63B, and a charge side part 13 compressing the air by this rotation energy and feeding it to the engine.

The exhaust side part 12 possesses the turbine wheel 14 surrounded by a turbine housing 15. The turbine housing 15 possesses an exhaust inflow passage 19 supplying the exhaust gases 63A, 63B to the turbine wheel 14.

The exhaust inflow passage 19 is divided in its inside into the left exhaust inflow passage 19A and the right exhaust inflow passage 19B by a partition wall 66. The front/rear exhaust piping 75A, 75B are respectively connected to the left and right exhaust inflow passages 19A, 19B. The exhaust inflow passage 19 comprises an approximately linear introduction part 69 connected to the front/rear exhaust piping 75A, 75B, and a scroll part 68 formed annularly so as to surround an outer periphery of the turbine wheel 14.

The turbine housing 15 possesses an exhaust outflow port 21 discharging the exhaust gases 63A, 63B after having given an energy to the turbine wheel 14. The exhaust outflow port 21 is approximately cylindrically formed so as to be approximately coaxial with a rotation center of the turbine wheel 14. An opening part in a side opposite to the exhaust outflow port 21 is closed by an exhaust side inner plate 22.

The turbine wheel 14 is rotated by being given the energy by the exhaust gases 63A, 63B flowing in from the exhaust inflow passages 19A, 19B. The shaft 23 is formed monolithically with the turbine wheel 14. The shaft 23 penetrates through the exhaust side inner plate 22, and is rotatably supported by a bearing 24. The turbine wheel 14 and the shaft 23 are generally made of a nickel-based superalloy and a steel alloy.

The compressor wheel 16 of the centrifugal type compressing the air is attached to a side opposite to the turbine wheel 14 of the shaft 23 (hereafter, referred to as tip part side of the shaft 23). The compressor wheel 16 possesses plural blade parts 18, and in its center part there is penetrated an attaching hole 25. The shaft 23 is inserted into the attaching hole 25 in a degree of slight clearance fit or shrink fit. The compressor wheel 16 is fixed to the shaft 23 by driving an attaching nut 26 to a male screw part 40 formed in the tip part of the shaft 23.

The compressor wheel 16 is accommodated inside the compressor housing 17. The compressor housing 17 possesses an intake inflow port 27 sucking the air into the compressor wheel 16. The intake inflow port 27 is approximately cylindrically formed so as to be approximately coaxial with a rotation center of the compressor wheel 16. The air compressed by the compressor wheel 16 is centrifugally discharged while passing through a charge discharging passage 28 formed annularly so as to surround an outer peripheral part of the compressor wheel 16. And, as shown in FIG. 7, it is cooled while passing through the after-cooler 67, and supplied to each of the cylinders 654A, 64B through the charge manifold 71.

However, in the above prior art, there is such a problem as mentioned below. That is, the exhaust inflow passage 19 is divided into the left and right exhaust inflow passages 19A, 19B by the partition wall 66 not only in the introduction part 69 but also in the scroll part 68. For this reason, especially in the turbine housing 15, whose passage sectional area is small, for a small flow rate, flow passages for the exhaust gases 63A, 63b are narrow, so that a loss of the energy is large.

Further, in recent years, it is demanded as a countermeasure to reduce nitrogen oxide (NOx) contained in the exhaust gases 63A, 63B of the diesel engine 62.

One of effective measures solving this problem is a technique referred to as EGR (Exhaust Gas Recirculation) system. This is one in which one part of the exhaust gases 63A, 63B discharged from the engine 62 is returned to a charge system of the engine 62 and recirculated.

In FIG. 10, front/rear EGR passages 73A, 73B are respectively connected to the front/rear exhaust manifolds 65A, 65B respectively connected to the front/rear cylinder groups 64A, 64B. The front/rear EGR passages 73A, 73B are connected to the charge manifold 71 for the cylinders 64A, 64B. By this, one part (these are referred to as EGR gases 74A, 74B) of the exhaust gases 63A, 63B entering into the exhaust manifolds 65A, 65B is returned from the EGR passages 73A, 73B to the cylinders 64A, 64B while passing through the charge manifold 71, and recirculated.

However, if the EGR passages 73A, 73B are respectively connected to the front/rear exhaust manifolds 65A, 65B in this manner, there is a problem that the apparatus becomes a large size because the two EGR passages 73A, 73B are necessary and a management of them is required. Moreover, there arises a necessity to connect various components, such as EGR coolers 72A, 72B cooling the EGR gases 74a, 74B, respectively to midways of the EGR passages 73A, 73B. Further, two sets of piping for cooling water to the EGR cooler 72A, 72B, and so forth are necessary, so that a constitution of the apparatus becomes complex.

Further, as shown in FIG. 11, there has been considered a constitution in which the EGR passage 73B is connected only to one exhaust manifold 65B, and the EGR gas 74B is returned to the charge manifold 71. However, if made in this manner, a difference occurs between a piping resistance of the front exhaust manifold 65A and that of the rear exhaust manifold 65B. For this reason, a flow rate of the exhaust gas 63A exhausted from the front cylinder group 64A becomes different from that of the exhaust gas 63B exhausted from the rear cylinder group 64B. As a result, there is a problem that a combustion in each of the cylinders 64A, 64B becomes not uniform and thus an unbalance occurs in an operation.

Further, as shown in FIG. 12, the front/rear exhaust piping 75A, 75B are joined somewhere short of the exhaust inflow passage 19 without providing the partition wall 66 in the exhaust inflow passage 19. And, there has been considered also a constitution in which an EGR passage 73 is connected to a joined exhaust piping 75, and the EGR gas 74 is returned to the charge manifold 71 while passing through an EGR cooler 72.

However, if made in this manner, there is the fact that, for example under a state that the exhaust gas 63A exhausted from the front cylinder group 64A is remaining, the exhaust gas 63B enters from the rear cylinder group 64B into the exhaust piping 75. As a result, the exhaust interference occurs, and a flow of the exhaust gas 63B from the rear cylinder group 64B is hindered by a flow of the exhaust gas 63A from the front cylinder group 64A, so that an engine pumping work increases and thus fuel consumption is deteriorated.

In order to avoid such an exhaust interference, for example in FIG. 1 and FIG. 3 of Patent Document 1 (JP-A-8-28286), there is disclosed a technique avoiding the exhaust interference by providing the two turbine wheels 14 although it is not an example using the EGR. However, if the two turbine wheels 14 are provided, there is a problem that a volume occupied by the turbocharger 11 is increased and it becomes expensive.

Further, as shown in FIG. 2 of Patent Document 2 (JP-A-57-124028), there is a known technique where the exhaust interference is prevented by providing a scroll chamber inside the exhaust manifolds 65A, 65B. However, according to such a technique, the exhaust manifolds 65A, 65B become very large sizes. Accordingly, it is possible to use this technique in a large size engine such as for a ship, but it is difficult to apply it to an apparatus, such as construction machinery, limited in its installation area.

SUMMARY OF THE INVENTION

The invention is one made in view of the above problems, and its object is to provide a turbocharger whose constitution is compact, so that the exhaust interference seldom occurs, and which can be applied also to an EGR type engine.

In order to achieve the above object, in a turbocharger concerning the invention, an exhaust inflow passage has an introduction part formed approximately linearly from an inlet through which an exhaust gas is introduced, a scroll part annularly surrounding a circumference of a turbine wheel, and a tongue part provided in a rear end part of a roll of the scroll part annularly surrounding a circumference of a turbine wheel and forms a boundary against the introduction part formed approximately linearly from an inlet through which an exhaust gas is introduced. The introduction part of the exhaust inflow passage possesses a partition part dividing a range from an inlet to a predetermined position in a downstream of the inlet into two exhaust inflow passages, a throttle part, whose sectional area becomes gradually small, from the inlet to a throttle outlet where the partition part ceases, a joining part where exhaust gases passing through the left and right exhaust inflow passages are joined, and a diffuser part, whose sectional area becomes gradually large, from the joining part to the tongue part.

By this, since a pulse converter is provided in the exhaust inflow passage inside the turbocharger, a compact constitution is obtained. Further, by the pulse converter, an interference between the exhaust gases introduced from the inlets in two places can be reduced. Additionally, since a dynamic pressure can be effectively converted into a static pressure, a loss of energy for rotating the turbine wheel becomes small.

In the turbocharger concerning the invention, a sum of sectional areas of the exhaust inflow passages at the throttle outlet may be made 50–80% of a sectional area of the exhaust inflow passage at the tongue part, or in the diffuser part a minimum sectional area of the exhaust inflow passages may be made 50–80% of a maximum sectional areas of the exhaust inflow passages. By this, the loss of the energy when recovering the dynamic pressure as the static pressure becomes small.

In the turbocharger concerning the invention, a distance between the throttle inlet to the throttle outlet may be made 20–40% of a distance from the throttle inlet to a rear end of the tongue part. By this, it is possible to prevent the exhaust interference by sufficiently increasing flow velocities of the exhaust gases and, since the diffuser part is long, the dynamic pressure can be effectively converted into the static pressure.

In the turbocharger concerning the invention, an EGR passage taking out one part of the exhaust gas flowing through the exhaust inflow passage and recovering it to a charge side of an engine may be connected to a downstream of the joining part. By this, it is possible to take out one part of the exhaust gas by only one EGR passage without destroying a balance between the exhaust gases exhausted from the front/rear cylinder groups. Accordingly, the number of components of the EGR cooler and so forth becomes small.

DESCRIPTION OF THE PREFERRED EMBODIMENTS

Figure 1:
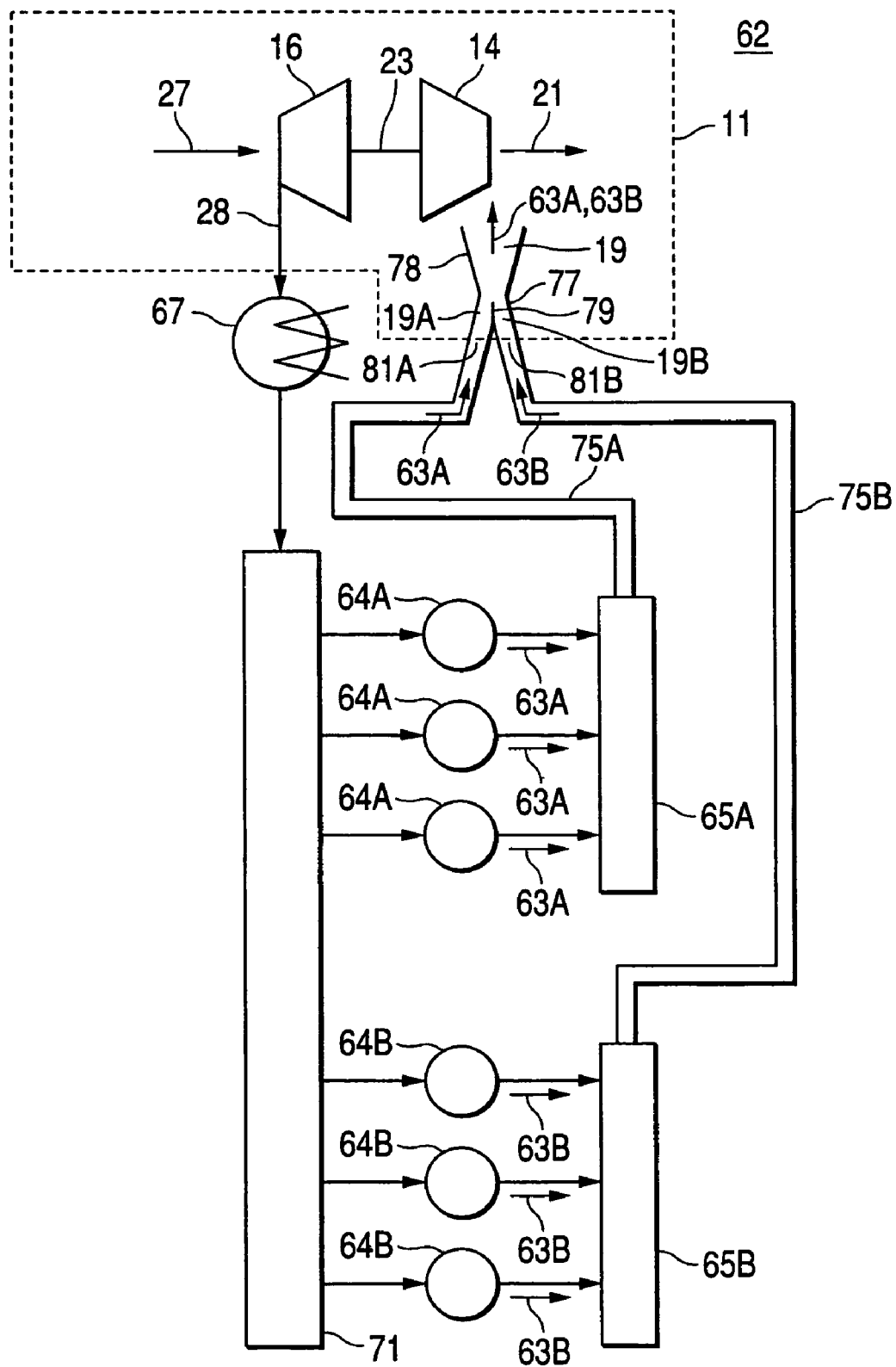
FIG. 1 is a piping system diagram of an engine using a turbocharger concerning a 1st embodiment of the invention.
Figure 2:
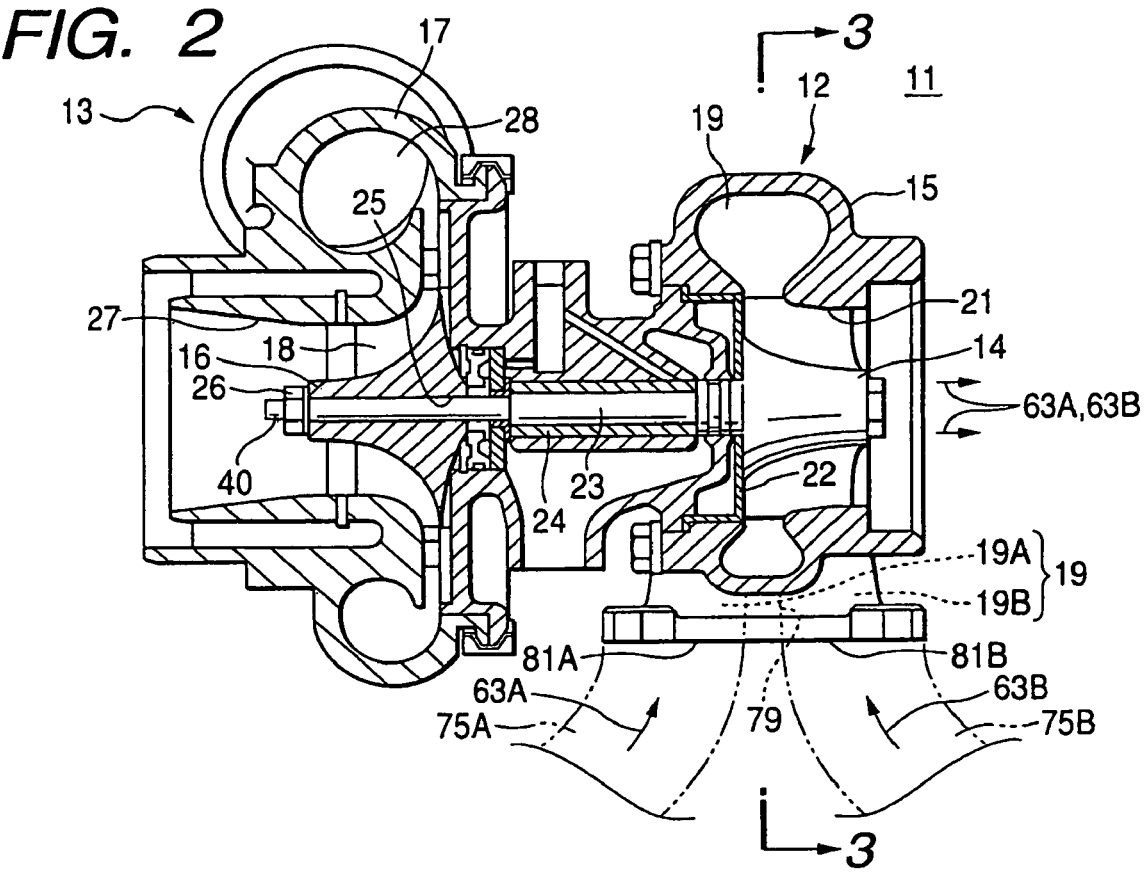
FIG. 2 is a side sectional view of the turbocharger concerning the 1st embodiment.

Hereunder, embodiments concerning the invention are explained in detail while referring to the drawings.

First, a 1st embodiment is explained. It is an example of an engine that does not use an EGR system. As shown in FIG. 1 to FIG. 4, the exhaust piping 75A, 75B are respectively connected to the front/rear exhaust manifolds 65A, 65B. The introduction part 69 of the exhaust inflow passage 19 is bisected from its inlets 81A, 81B to its approximately halfway part into the two exhaust inflow passages 19A, 19B by a partition part 79. And, the exhaust piping 75A, 75B are respectively connected to inlets 81A, 81B of the exhaust inflow passages 19A, 19B.

The exhaust gases 63A, 63B exhausted from the front/rear cylinder groups 64A, 64B respectively flow into the inlets 81A, 81B of the two exhaust inflow passages 19A, 19B while passing through the front/rear exhaust manifolds 65A, 65B and the front/rear exhaust piping 75A, 75B. And, the exhaust gases 63A, 63B are joined at a joining part 82 in a halfway part, of the introduction part 69, where the partition part 79 ceases.

Figure 4:
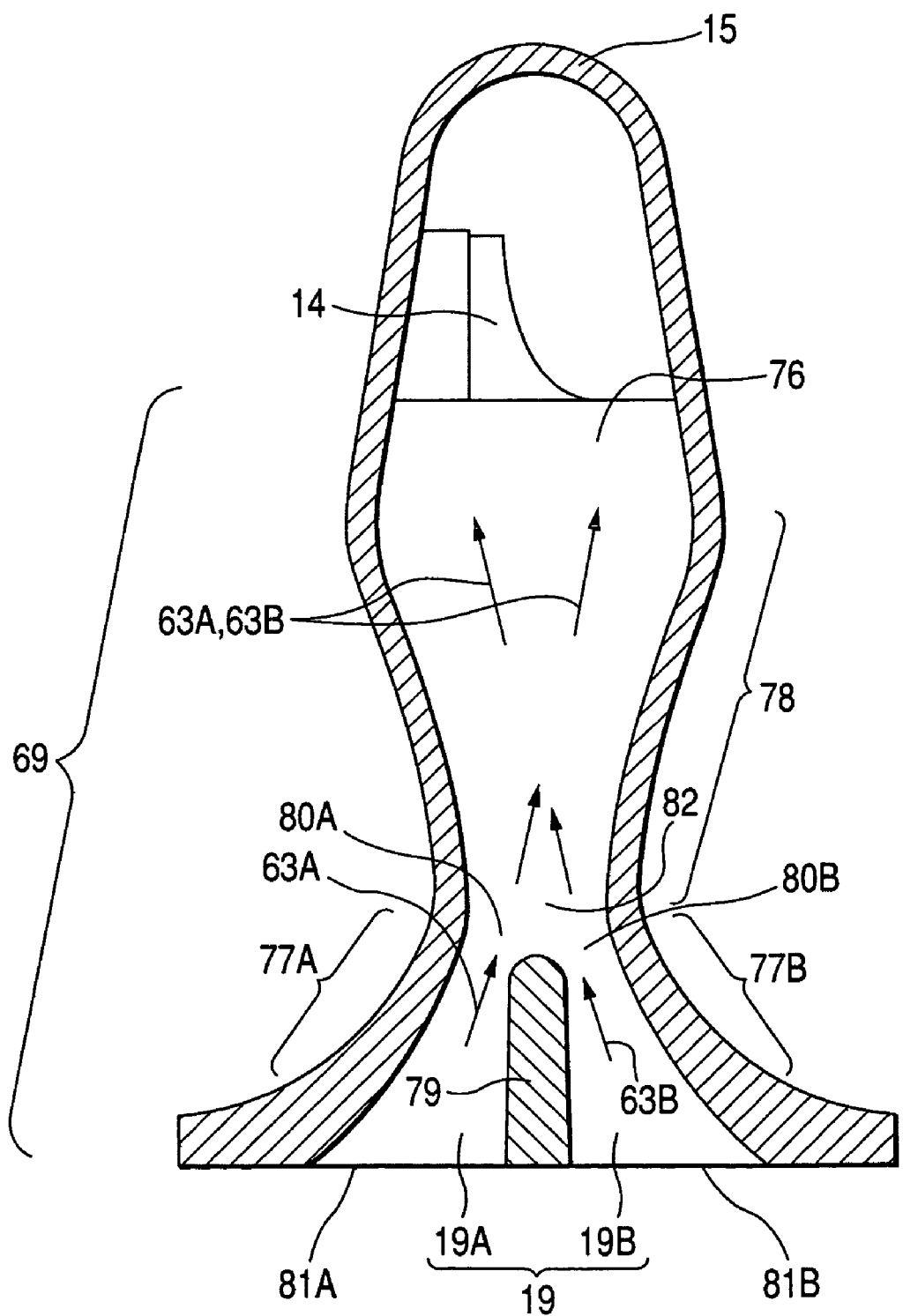
FIG. 4 is a sectional view taken along a line 4—4 of FIG. 3.

At this time, as shown in FIG. 4, the two exhaust inflow passages 19A, 19B are constituted such that their sectional areas are largest in the inlets 81A, 81B, and their sectional areas become gradually small until reaching to throttle outlets 80A, 80B where the partition part 79 ceases. That is, throttle parts 77A, 77B are formed between the inlets 81A, 81B and the throttle outlets 80A, 80B. As a result, the exhaust gases 63A, 63B having entered into the inlets 81A, 81B gradually increase their flow velocities, and reach to the joining part 82.

Incidentally, as structures of the throttle parts 77A, 77B, in FIG. 4, an outer wall and an inner wall of the turbine housing 15 are depicted so as to be concaved inward, but it is not limited to this. For example, the throttle parts 77A, 77B may be formed with the outer wall being flat and the inner wall being protruded inward.

The exhaust inflow passage 19 is constituted such that, in a downstream of the joining part 82, its sectional area becomes gradually large. By this, a diffuser part 78 is formed. Incidentally, in a case where a direction is expressed by words "from an upstream to a downstream", it is made one on the basis of a direction of a flow of the exhaust gas shown by an arrow mark 63A, 63b in FIG. 3.

Figure 3:
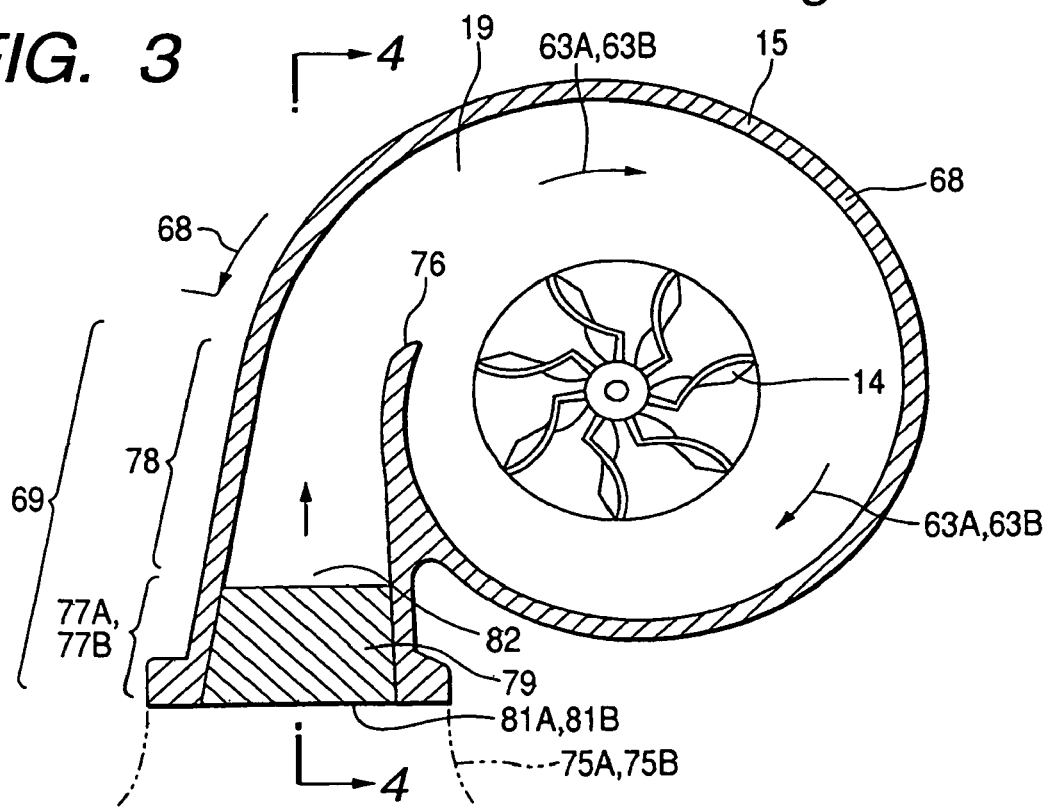
FIG. 3 is a sectional view taken along a line 3—3 of FIG. 2.

By such a diffuser part 78, the exhaust gases 63A, 63B emerging from the throttle parts 77a, 77b at high speeds gradually regain the static pressure. And, they flow into the scroll part 68 without losing the energy so much, thereby driving the turbine wheel 14. At this time, as shown in FIG. 3, a part provided in a rear end part of a roll of the scroll part annularly surrounding a circumference of a turbine wheel and forms a boundary against the introduction part formed approximately linearly from an inlet through which an exhaust gas is introduced is referred to a tongue part 76.

As explained above, according to this embodiment, in the exhaust inflow passage 19 of the turbine housing 15, there are provided the throttle parts 77A, 77B and, following these, the diffuser part 78. By this, it is possible to compactly constitute the pulse converter and efficiently transmit the energies of the exhaust gases 63A, 63B to the turbine wheel 14.

The exhaust gas 63A emerging from the front exhaust manifold 65A and the exhaust gas 63B emerging from the rear exhaust manifold 65B are joined after having been increased in their flow velocities respectively in the throttle parts 77A, 77B. Accordingly, the exhaust interference becomes difficult to occur.

Incidentally, it is suitable that a distance between the throttle inlet 81A, 81B to the throttle outlet 80A, 80B is 20–40% of a distance from the throttle inlet 81A, 81B to a rear end of the tongue part 76.

By this, since the exhaust interference can be prevented by sufficiently increasing the flow velocity of the exhaust gas and the diffuser part 78 of a sufficient length can be obtained, it is possible to efficiently convert the dynamic pressure into the static pressure.

It is appropriate that a sum of the sectional areas of the two exhaust inflow passages 19A, 19B at the throttle outlets 80A, 80B is made 50–80% of a sectional area of the exhaust inflow passage 19 at the tongue part 76, or in the diffuser part a minimum sectional area of the exhaust inflow passages is 50–80% of a maximum sectional areas of the exhaust inflow passages. By doing so, when the exhaust gases 63A, 63B pass through the diffuser part 78, it is possible to convert the dynamic pressure into the static pressure while reducing the loss of the energy.

Figure 5:
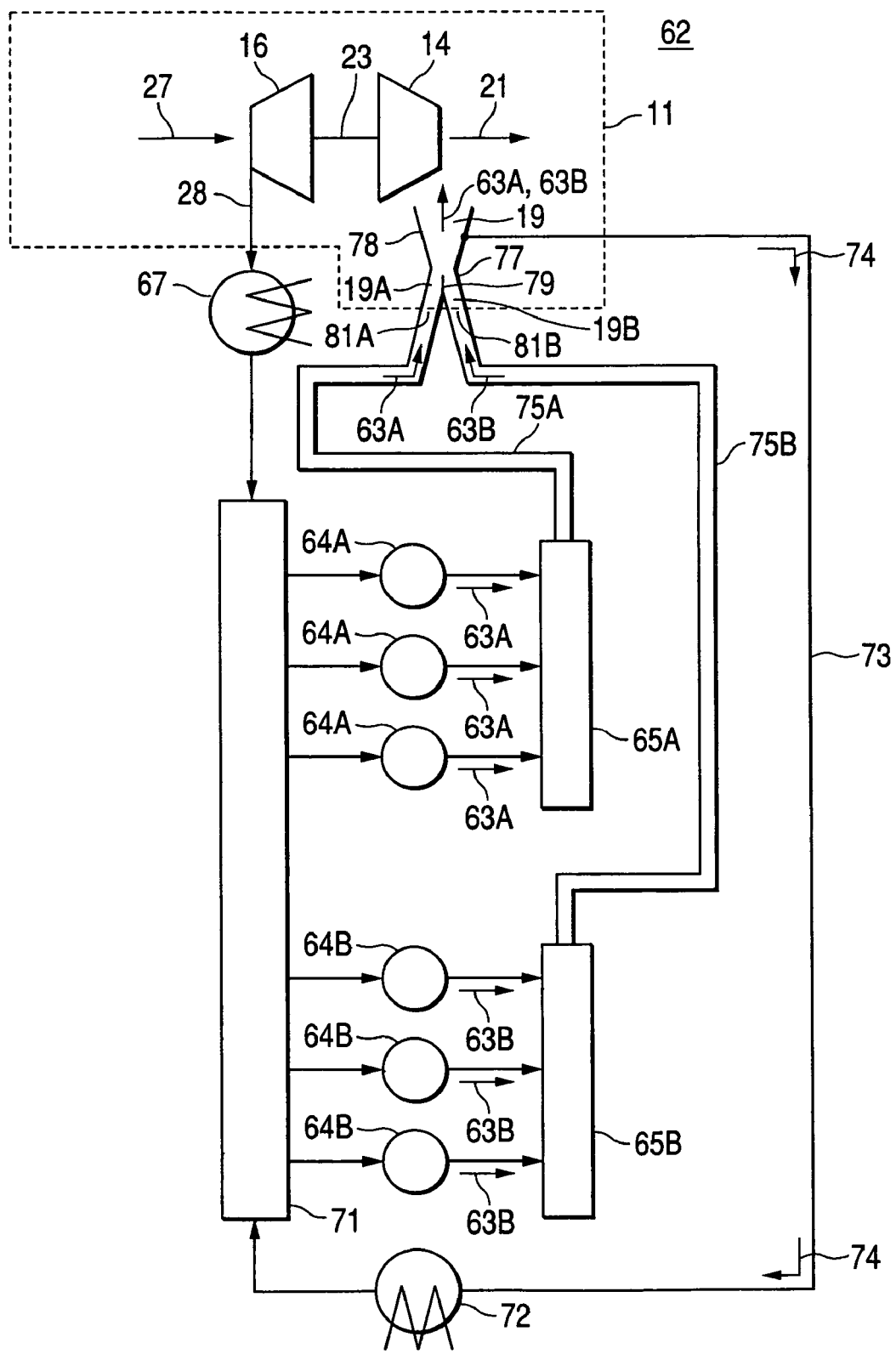
FIG. 5 is a piping system diagram of an engine using a turbocharger concerning a 2nd embodiment of the invention.
Figure 6:
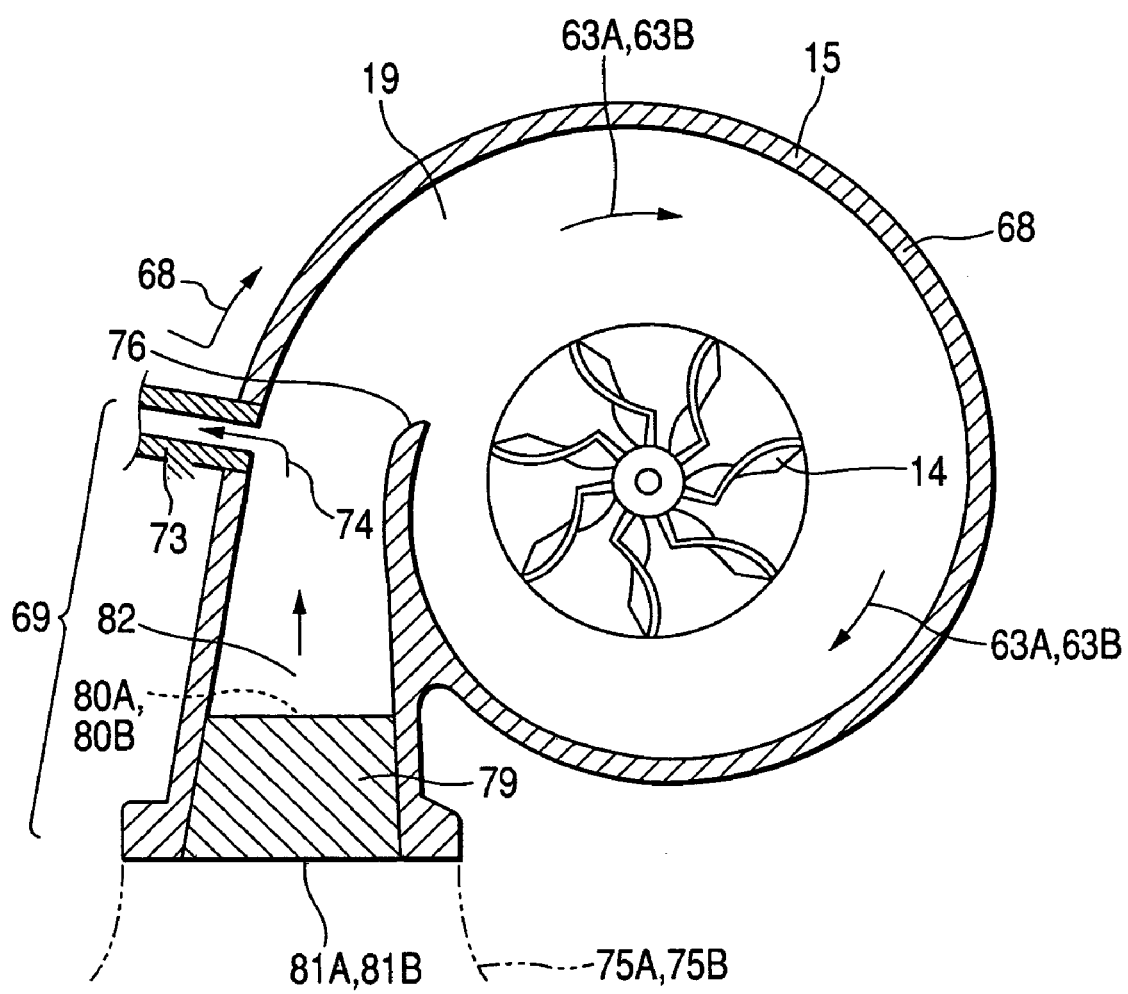
FIG. 6 is a side sectional view of an exhaust inflow passage of the turbocharger concerning the 2nd embodiment.
Figure 7:
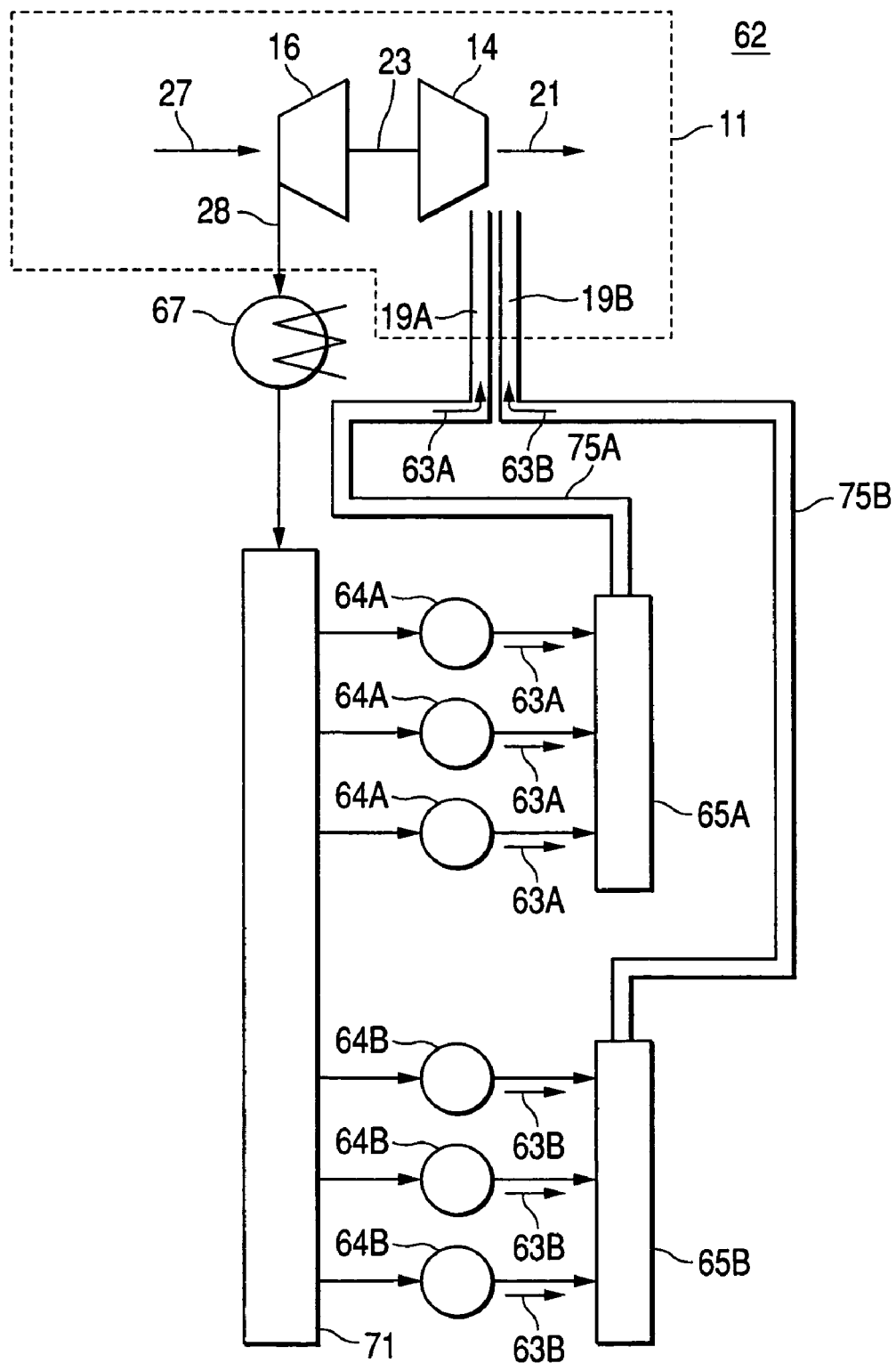
FIG. 7 is a piping system diagram of an engine using a turbocharger concerning a prior art.
Figure 8:
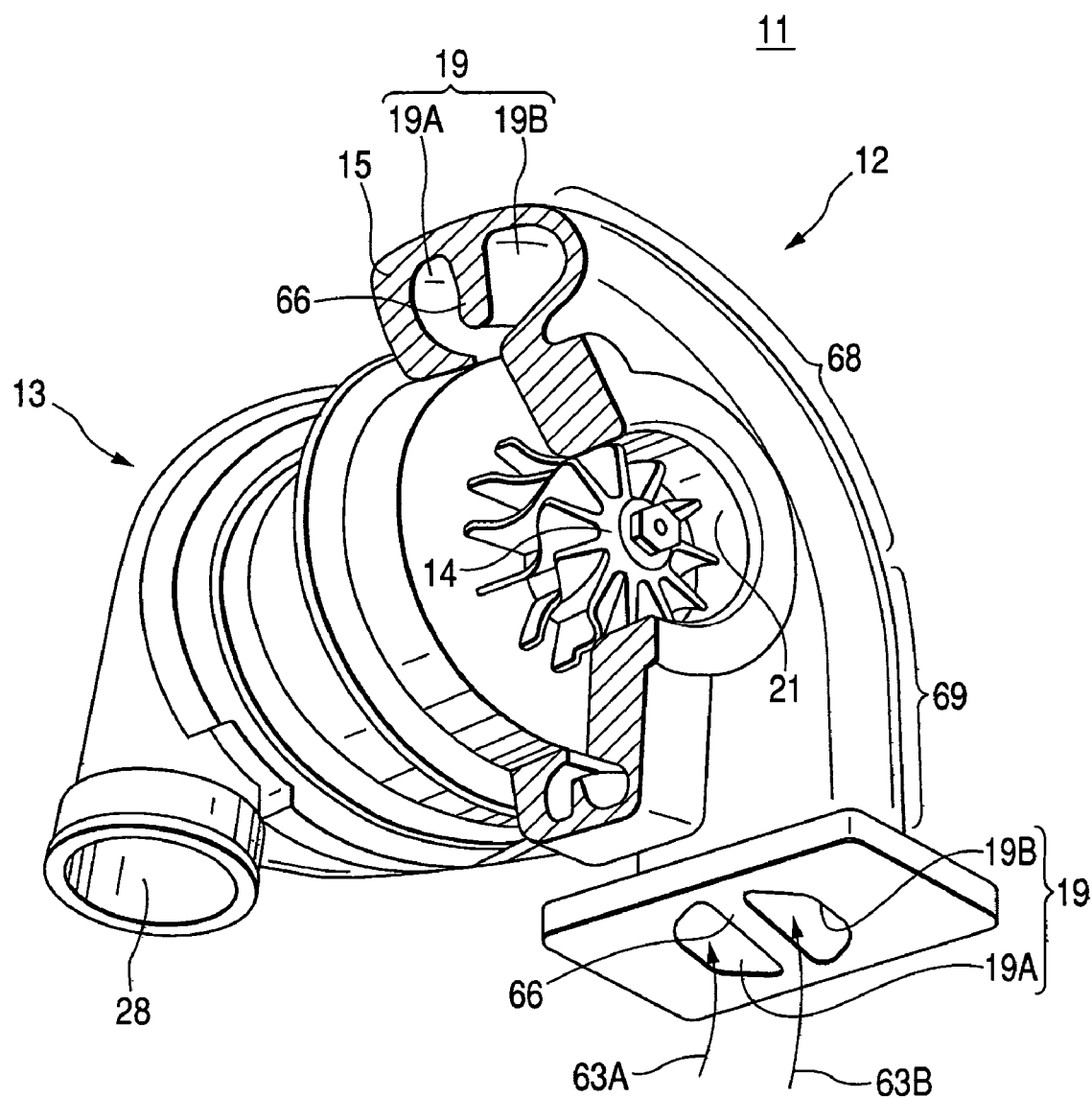
FIG. 8 is a perspective view of the turbocharger concerning the prior art.
Figure 9:
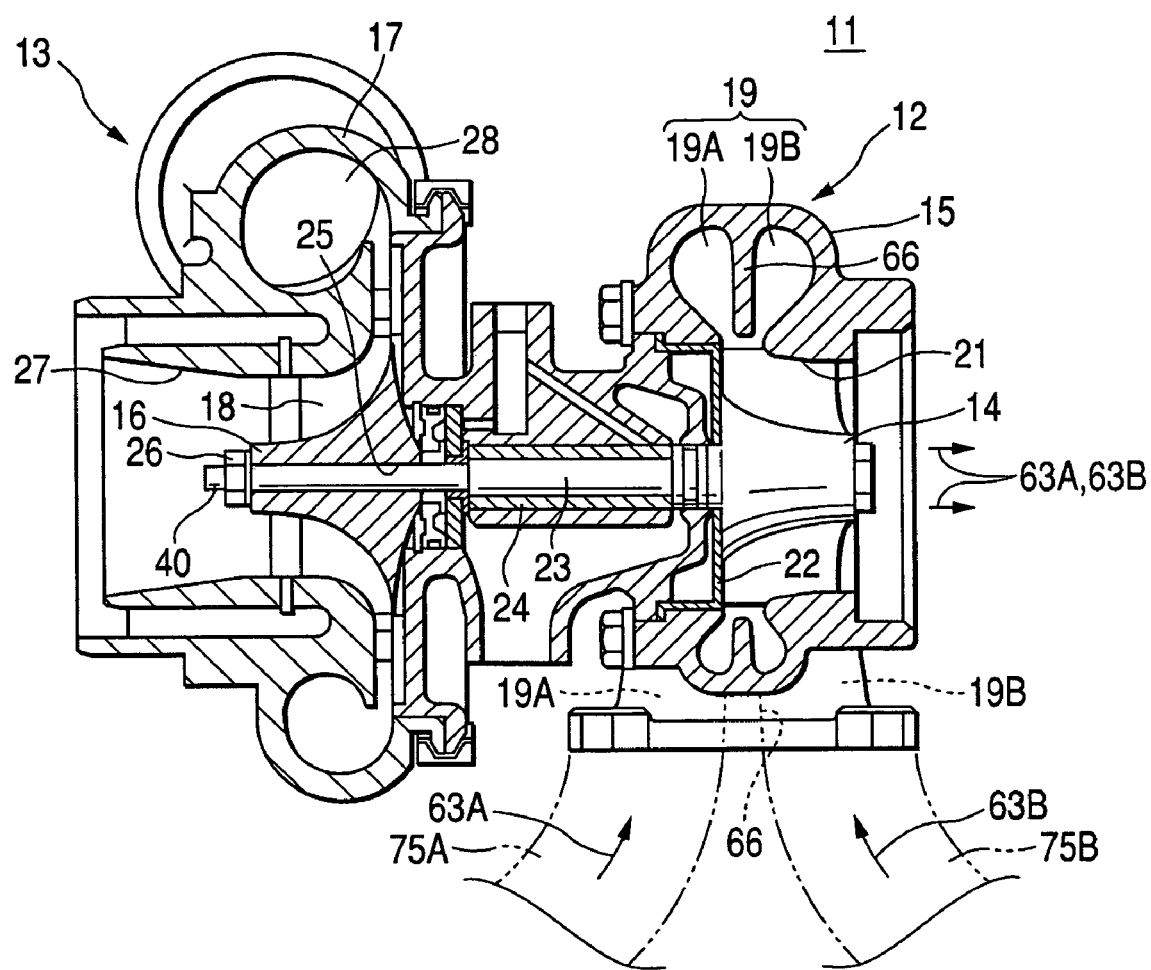
FIG. 9 is a side sectional view of the turbocharger concerning the prior art.
Figure 10:
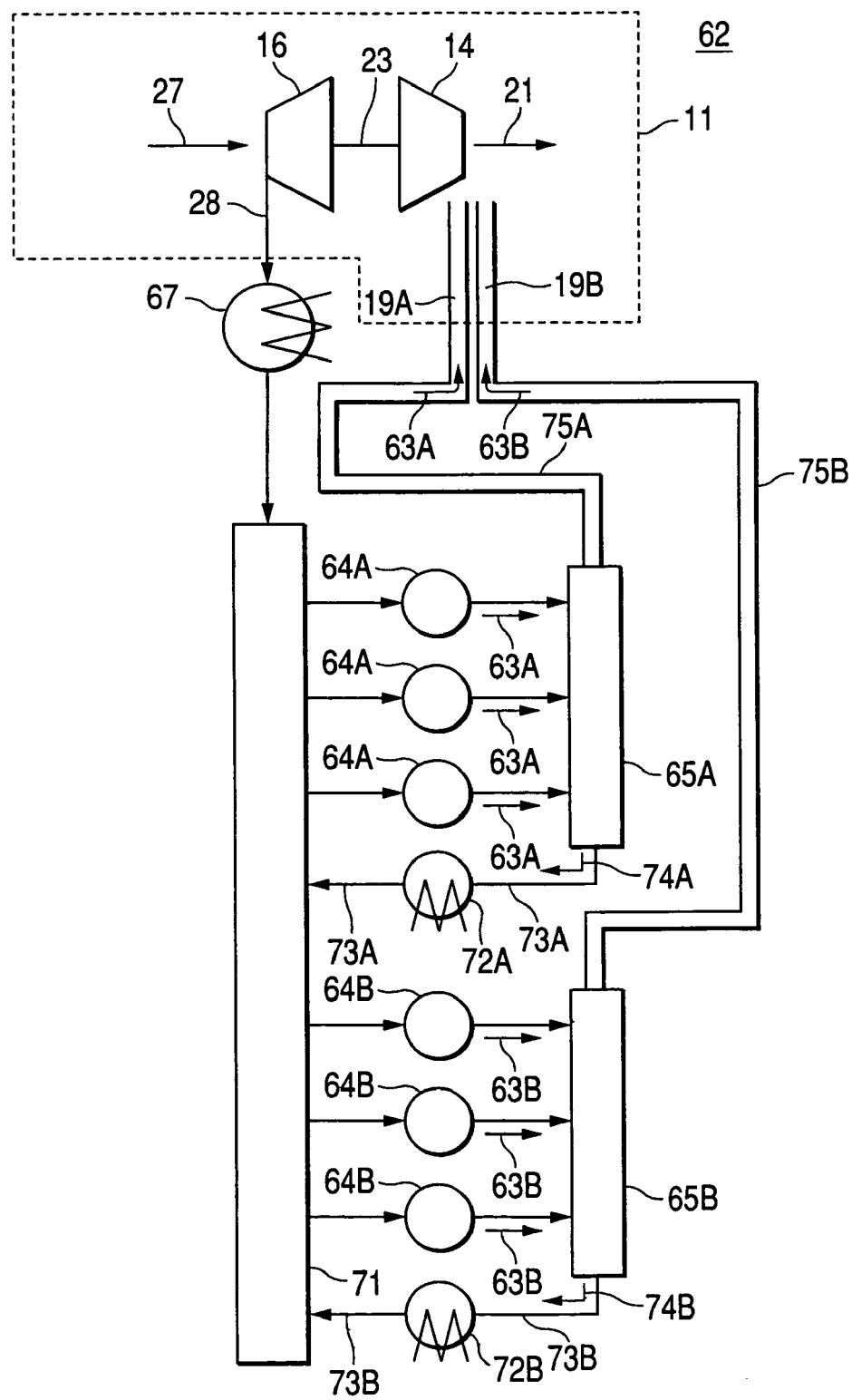
FIG. 10 is a piping system diagram of an engine using an EGR system concerning a prior art.
Figure 11:
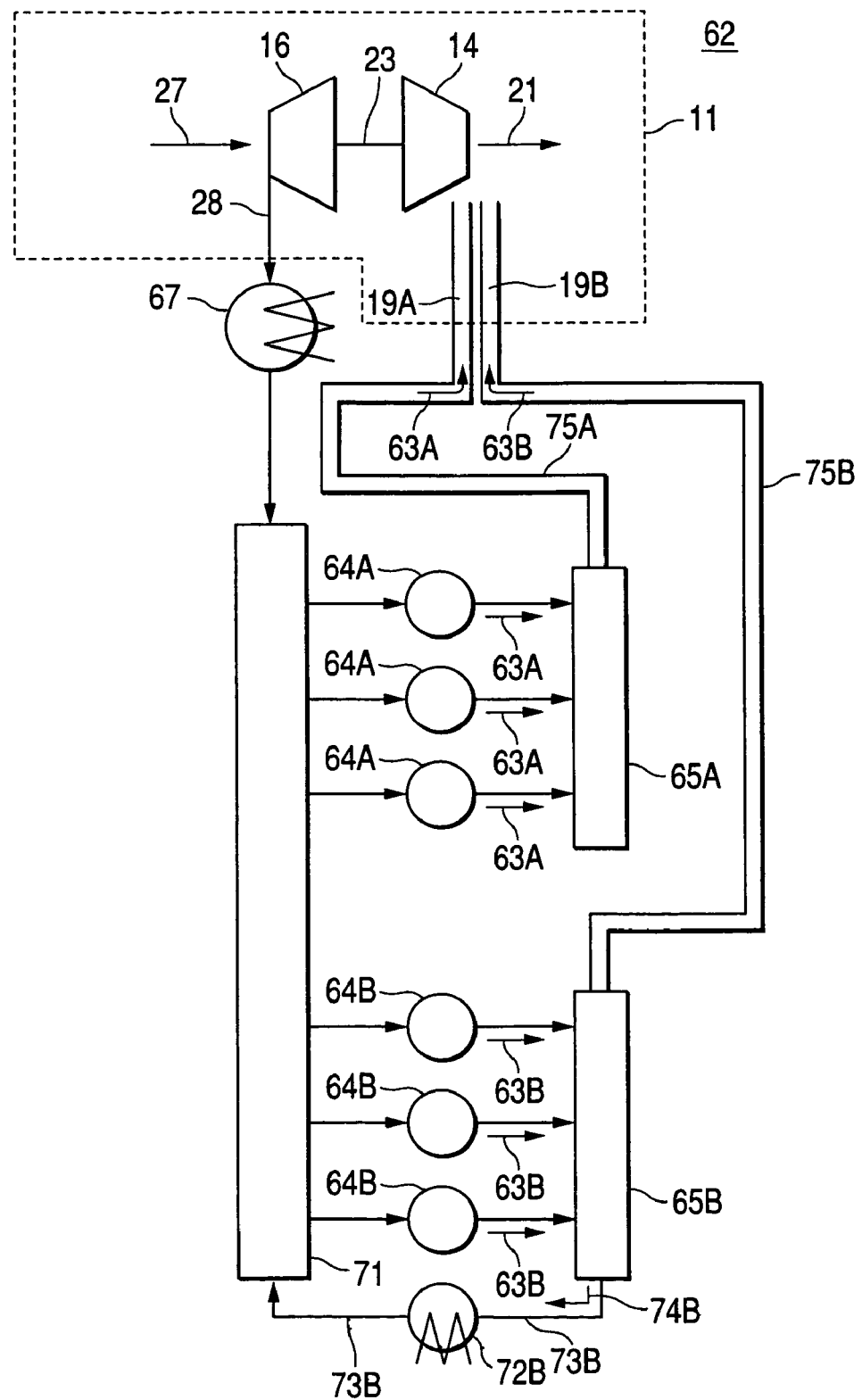
FIG. 11 is another piping system diagram of an engine using an EGR system concerning a prior art.
Figure 12:
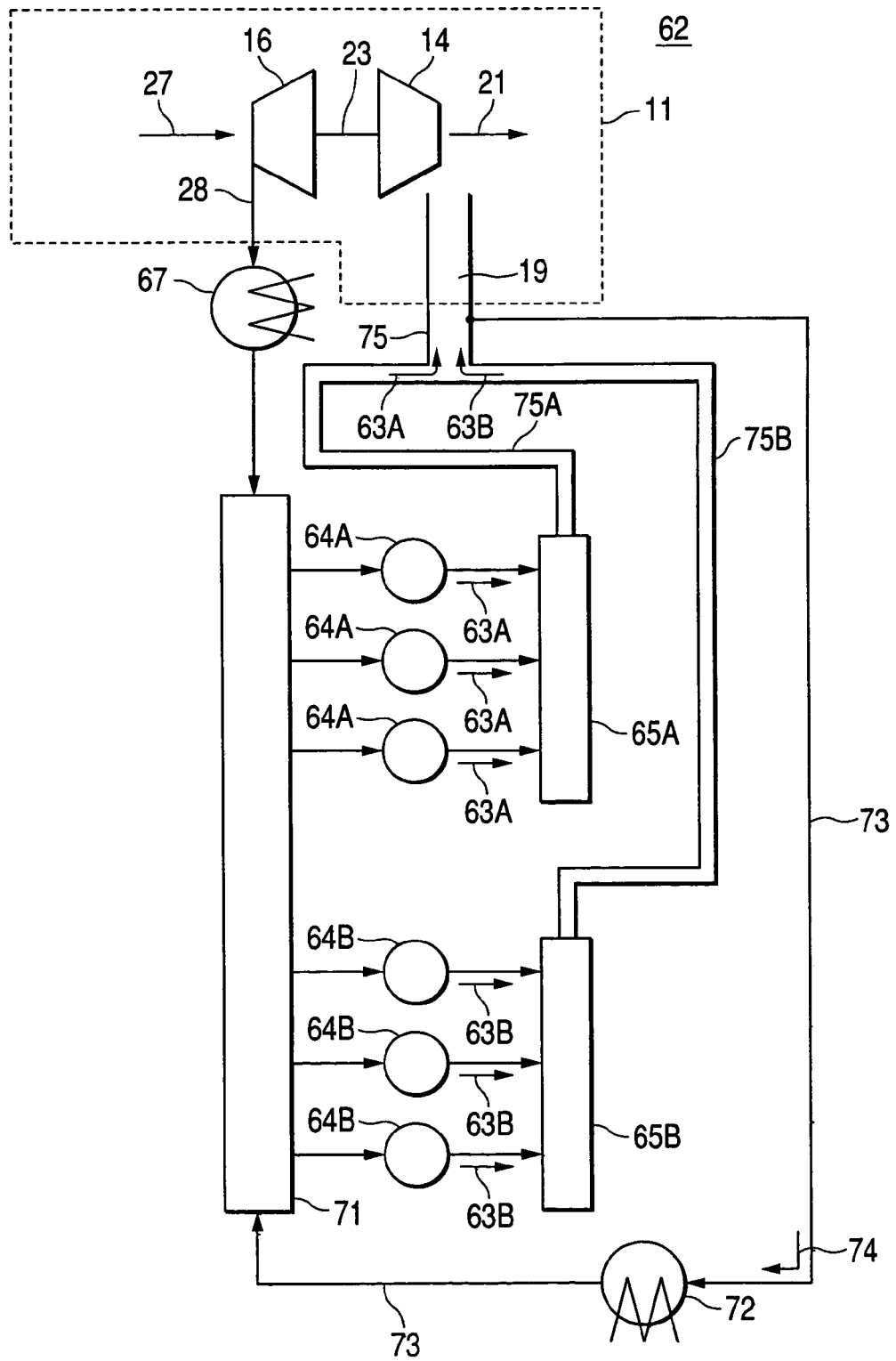
FIG. 12 is still another piping system diagram of an engine using an EGR system concerning a prior art.

Next, it is explained about a 2nd embodiment. As shown in FIG. 5 and FIG. 6, the EGR passage 73 is connected to an outside of the scroll part 68 of the exhaust inflow passage 19. A EGR gas 74 taken out through the EGR passage 73 is supplied to each of the cylinders 64A, 64B through the charge manifold 71, and recirculated.

Like this, according to the 2nd embodiment, it is adapted such that the exhaust gases 63A, 63B enter, after having been joined, into the EGR passage 73 as the EGR gas 74. By this, since the exhaust gases 63A, 63B emerging from the front/rear exhaust manifolds 65A, 65B equally enter into the EGR passage 73, an unbalance of combustion between the front/rear cylinder groups 64A, 64B does not occur. Accordingly, in addition to the advantage of the 1st embodiment, also in the EGR system, a good operation of the engine 62 is made possible.

Further, after the static pressures of the exhaust gases 63A, 63B have been regained through the diffuser part 78, one part of them is taken out as the EGR gas 74 through the EGR passage 73. Accordingly, at a taking-out time, pressure loses of the exhaust gases 63A, 63B are difficult to occur, so that the loss of the energy is small.

Incidentally, in FIG. 6, the EGR passage 73 is connected to the downstream of the tongue part 76, but it may be connected to substantially the same position as the tongue part 76 or to slightly upstream of the tongue part 76. That is, it suffices if it is adapted such that the pressure loss becomes as small as possible when taking out the EGR gas 74.

What is claimed is:

1. A turbocharger integrally including an exhaust inflow passage guiding an exhaust gas to a turbine wheel, the exhaust inflow passage being provided in a turbine housing of the turbocharger and comprising:

an introduction part formed approximately linearly from an inlet through which the exhaust gas is introduced;

a scroll part annularly surrounding a circumference of the turbine wheel; and a tongue part provided in a rear end part of a roll of the scroll part annularly surrounding the circumference of the turbine wheel and forming a boundary against the introduction part formed approximately linearly from the inlet through which the exhaust gas is introduced, and the introduction part having:

a partition part dividing the exhaust inflow passage into first exhaust inflow passage and second exhaust inflow passage within a range from the inlet to a predetermined position in a downstream of the inlet, a throttle part, whose sectional area becomes gradually small from the inlet to a position where the partition part ceases, a joining part where the exhaust gases passing through the first exhaust inflow passage and the second exhaust inflow passage are joined, and a diffuser part, whose sectional area becomes gradually large from the joining part to the tongue part.

2. The turbocharger according to claim 1, wherein a sum of sectional areas of the first exhaust inflow passage and the second exhaust inflow passage at the position where the partition part ceases is 50–80% of a sectional area of the exhaust inflow passage at the tongue part.

3. The turbocharger according to claim 2, wherein a flow passage length of the throttle part from the inlet to the position where the partition part ceases is 20–40% of a flow passage length of the introduction part from the inlet to a rear end of the tongue part.

4. The turbocharger according to claim 3, wherein an EGR passage taking out a part of the exhaust gas flowing through the exhaust inflow passage and recovering the part of the exhaust gas to a charge side of an engine is connected to a downstream of the joining part.

5. The turbocharger according to claim 2, wherein an EGR passage taking out a part of the exhaust gas flowing through the exhaust inflow passage and recovering the part of the exhaust gas to a charge side of an engine is connected to a downstream of the joining part.

6. The turbocharger according to claim 1, wherein in the diffuser part a minimum sectional area of the exhaust inflow passage is 50–80% of a maximum sectional areas of the exhaust inflow passage.

7. The turbocharger according to claim 6, wherein a flow passage length of the throttle part from the inlet to the position where the partition part ceases is 20–40% of a flow passage length of the introduction part from the inlet to a rear end of the tongue part.

8. The turbocharger according to claim 7, wherein an EGR passage taking out a part of the exhaust gas flowing through the exhaust inflow passage and recovering the part of the exhaust gas to a charge side of an engine is connected to a downstream of the joining part.

9. The turbocharger according to claim 6, wherein an EGR passage taking out a part of the exhaust gas flowing through the exhaust inflow passage and recovering the part of the exhaust gas to a charge side of an engine is connected to a downstream of the joining part.

10. The turbocharger according to claim 1, wherein a flow passage length of the throttle part from the inlet to the position where the partition part ceases is 20–40% of a flow passage length of the introduction part from the inlet to a rear end of the tongue part.

11. The turbocharger according to claim 10, wherein an EGR passage taking out a part of the exhaust gas flowing through the exhaust inflow passage and recovering the part of the exhaust gas to a charge side of an engine is connected to a downstream of the joining part.

12. The turbocharger according to claim 1, wherein an EGR passage taking out a part of the exhaust gas flowing through the exhaust inflow passage and recovering the part of the exhaust gas to a charge side of an engine is connected to a downstream of the joining part.

* * * * *